OR  3,692,381

Champagne

[15] 3,692,381
[45] Sept. 19, 1972

[54] HOLOGRAPHY WITH SPECULAR OBJECTS

[72] Inventor: Edwin B. Champagne, Ann Arbor, Mich.

[73] Assignee: GCO, Inc., Ann Arbor, Mich.

[22] Filed: March 25, 1971

[21] Appl. No.: 127,978

[52] U.S. Cl. ................................................. 350/3.5
[51] Int. Cl. ........................................... G02b 27/22
[58] Field of Search ....................................... 350/3.5

[56] References Cited

OTHER PUBLICATIONS

The Engineering Uses of Holography, pp. 435– 448, Cambridge University Press (7/1970).

*Primary Examiner*—David Schonberg
*Assistant Examiner*—Robert L. Sherman
*Attorney*—Barnard, McGlynn & Reising

[57] ABSTRACT

A holographic analysis of the deflection occurring in an aircraft wing section as a result of loading is conducted to uncover defects in the structure. In forming the hologram a lens is employed to focus the object beam reflected from the specular wing surface near the hologram plane. The resultant high light energy distribution at the hologram plane allows very short exposure times, easing illumination source and vibration isolation requirements.

In an alternate embodiment, a second lens is placed so as to receive the focused beam and to image the object surface at the holographic plane, and two exposures are made on the plate before and after loading with reference beams that make different angles with the plate. The resulting hologram is reconstructed with separate reference beams which may be adjusted to vary the fringe pattern.

6 Claims, 4 Drawing Figures

PATENTED SEP 19 1972 3,692,381

INVENTOR.
Edwin B. Champagne
BY
Barnard, McGlynn & Reising
ATTORNEYS

HOLOGRAPHY WITH SPECULAR OBJECTS

This invention relates to methods and apparatus for forming holograms and more particularly to the practice of holographic interferometry with specularly reflecting objects.

In the past few years extensive research and development has been performed on techniques for recording and reconstructing coherent light wavefronts by holography. Holographic interferometry is a technique using holography for comparing the wavefronts which are reflected by an object at two different times in order to measure the deformation which has occurred in the object between the times. Holographic interferometry is well adapted to identify anomalies in deformation patterns and therefore shows great promise as a technique of non-destructive testing. In the "double-exposure" type of holographic interferometry a pair of holograms of the wavefronts emanating from an object are formed at two separated times, and upon reconstruction the interference between the two reconstructed wavefronts produces a pattern of fringes on the image which reveals the deformation pattern. In "real-time" holographic interferometry only a single wavefront is recorded and it is coherently compared with a wavefront reflected from the object at a later time.

Difficulty has been encountered in practicing holographic interferometry on a production basis as opposed to a laboratory basis because of certain constraints associated with the process. First, the process employs coherent light generated by lasers and very powerful, large and expensive lasers are required to generate the high light intensities required to form a hologram. Additionally, relatively long exposure times are required, and any motion of the system during the exposure time will ruin the resulting hologram. Accordingly, extremely heavy, high inertia, vibration-isolated platforms have been employed to stabilize both the object and the optical apparatus during the formation of a hologram.

Both the need for the high-powered lasers and for stabilized tables to isolate the object from movement during the long exposure times required derive from the fact that in conventional holography systems only a very small percentage of the light used to illuminate the object is reflected to the photographic plate. When the illuminated surface of the object is diffused so as to scatter light in all directions, this dissipation of a large percentage of the illuminating light appears difficult to overcome. However, difficulty is encountered in obtaining enough available light at the photographic plate even when the object presents a relatively good reflective surface, i.e. is "specular" or mirrorlike. In this case, a high percentage of the illuminating light is reflected in a preferred direction. However, if the photographic plate from which the hologram is to be formed is disposed in this reflected beam, the virtual image of the illumination source will appear as background to any point in the reconstructed wavefront which is viewed from the resulting hologram. The sharp intensity contrast between the bright illuminating source and the relatively dull object surface will make it extremely difficult to analyze the motion of the surface in an interferometric arrangement, be if double exposure or real time. Accordingly, present practice involves forming a hologram outside of the major reflected object beam so that the photographic plate only receives a small portion of the object beam which is scattered diffusely by the object. This heightens the requirements for a large illuminating source and long exposure times.

SUMMARY OF THE PRESENT INVENTION

The present invention contemplates a system for forming a hologram of an object having a strong specular nature and taking advantage of the strong directional nature of the reflection. Very broadly, the system differs from a conventional holographic apparatus in that a field lens or lens system is disposed in the path of either the beam which illuminates the object, the beam of light specularly reflected by the object, or both. In all cases the lenses are arranged so as to form a real image of the illumination source. The photographic plate is disposed in the object beam near this real image of the illumination source and effectively records a wavefront of the real image of the illumination source with the illuminated object surface as background. When this wavefront is reconstructed, the observer may view the background by looking through the reconstructed image of the illumination source.

This technique greatly increases the amount of light available for forming the hologram and accordingly allows a very substantial reduction in laser power and/or substantial decreases in exposure time, but has the disadvantage of requiring the reconstruction of the object surface to be viewed through the real image of the illuminating source. To correct this defeat, a second embodiment of the invention positions a lens at or near the point at which the real image of the illumination source occurs and spreads it to form an image of the object. The photographic plate is disposed at the image plane of this second lens so as to effectively form a hologram of the system consisting of the object and the two lenses, as imaged by this second lens. The illumination source is not imaged at the photographic plane by this lens and contributes only to the direction from which the image can be viewed.

Using this technique of focusing specular reflection from an object and exposing a hologram at the image plane of a lens, a pair of holograms may be made of the same object at two times so as to analyze the deformation occurring in the object between the two times. If the two exposures are made using reference beams which bear different angles to the photographic plate, two equivalent reference beams must be used in the reconstruction, and movement of one reference beam relative to the other will modify the overall fringe structure visible in the reconstruction which represents the measurement of the object deformation between the times of the two holographic exposures. The reference beams may be adjusted to eliminate those parts of the fringe pattern which result from overall motion of the object, allowing a detailed examination of the fringes resulting from anomalies in the deformation pattern. Similarly, the relative position of the two reconstructing beams may be adjusted to modify the fringe spacing at a selected point on the object. The ability to manipulate the fringe pattern from a double-exposure hologram allows the processor to rapidly form holograms of sequential areas of an object for subsequent development and analysis.

The present invention thus adds the advantage of fast, lowepower exposure to the advantages of the image-plane hologram technique disclosed in my patent application Ser. No. 32.941.

As practiced in the laboratory, the present invention produced acceptable holograms using a 15 miliwatt helium-neon laser and an exposure time of 2.5 miliseconds. Calculations indicate that using a 1-watt argon laser, exposure times in the order of $25 \times 10^{-6}$ seconds may be achieved.

Other objects, advantages and applications of the present invention will be made apparent by the following detailed description of two preferred embodiments of the invention.

The description makes reference to the covering drawings, in which.

Figure 1:
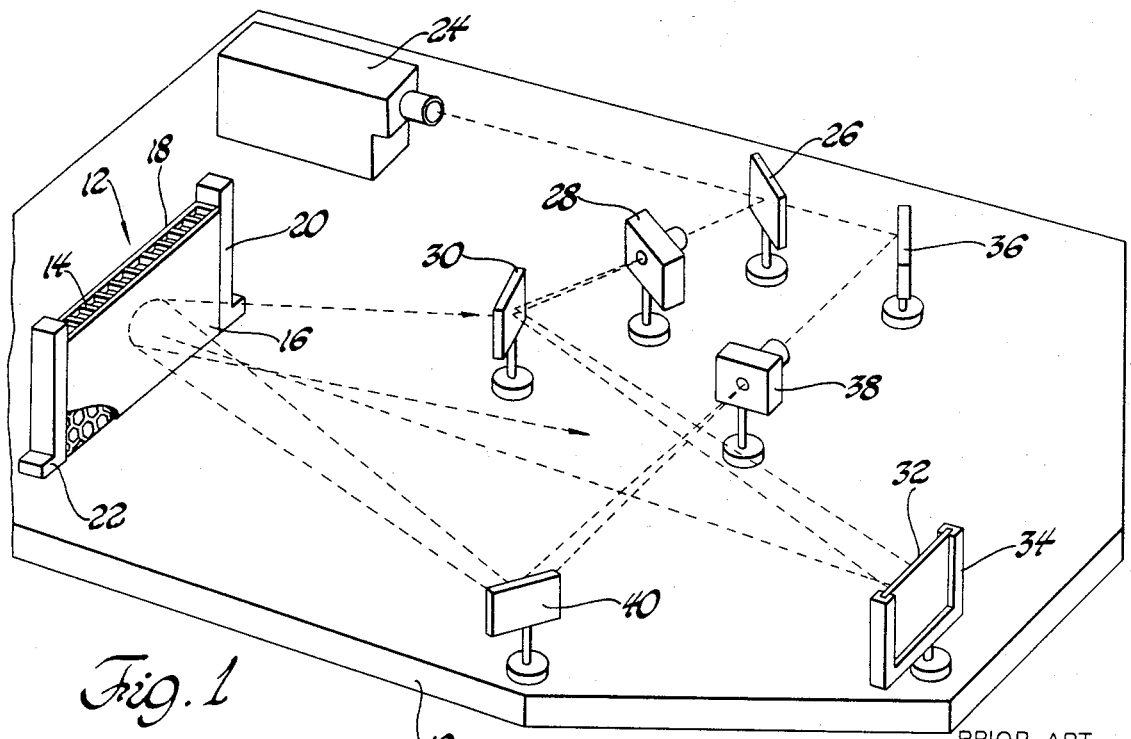
FIG. 1 is a perspective view of the apparatus for performing holographic interferometry in accordance with the teachings of the prior art.

Referring to the drawings, FIG. 1 illustrates apparatus arranged to form a hologram of a test object and to analyze the object by holographic interferometry, in accordance with the prior art practice. The object to be tested must be maintained in a highly stable relationship relative to the optical apparatus during processing and accordingly is supported on a heavy table 10 which is preferably formed of granite or cast iron.

The object is to be analyzed illustratively takes the form section of a metal honeycomb structure 12 consisting of a core 14 sandwiched between a pair of sheet skin sections 16 and 18. The lower left hand corner of the skin section 16 is shown broken away to illustrate the end configuration of the core. The rectangular test section is supported on the table 10 between a pair of uprights 20 and 22 which have their lower ends affixed to the table. The skin section 16 which is operated on by the optical apparatus is preferably formed of aluminum and has a relatively well finished surface so as to specularly reflect light which is incident on its surface.

The light source for the apparatus is provided by a laser 24 supported on the table and its beam is projected to a half-silvered mirror 26 which splits the beam into two sections. The reflected section is passed through a spacial filter 28 which includes a pin hole and an objective lens and the diverging beam from the spacial filter 28 is reflected by a mirror 30 to a photographic plate 32 supported in a plate holder 34. This comprises the reference beam for the recordation of a hologram.

The transmitted beam from the splitter 26 is reflected by a mirror 36 through a second spacial filter 38. The diverging beam from the filter 38 is reflected by a mirror 40 to the surface of the honeycomb skin 16.

The photographic plate is so positioned with respect to the mirror 40 and the test specimen 12 that is not exposed to the beam of light that is specularly reflected from the skin 16 but is rather disposed to as to only receive that part of the light which is diffusely reflected from the skin 16. As an alternative to this technique the photographic plate could be so disposed as to receive the totally reflected beam. If a portion of the specularly reflected beam impinges on the photographic plate the variation in illumination intensity between the specularly and reflected diffusely reflected sections will be great as to make it impossible to obtain exposure of both sections. If the photographic plate intercepts the specularly reflected beam it will effectively see a reflection of the source and only that small section of the surface of the skin 16 from which that source appears to be reflected may be studied. Accordingly, the only open alternative is to place the photographic plate so that it only receives the diffusely reflected light.

Since this diffusely illuminated light has a very low power density relative to the illumination source, a relatively powerful source must be used and relatively long exposure times, i.e. typically 2 to 5 seconds, must be employed. The stringent requirement for stability of the object relative to the optics arises from this requirement for a long exposure time. The advantages of the present invention over the prior art technique arise from its ability to utilize the specularly reflected light beam, thereby allowing the use of relatively low intensity sources and short exposure times which in turn greatly ease the stability problem.

Figures 2, 3:
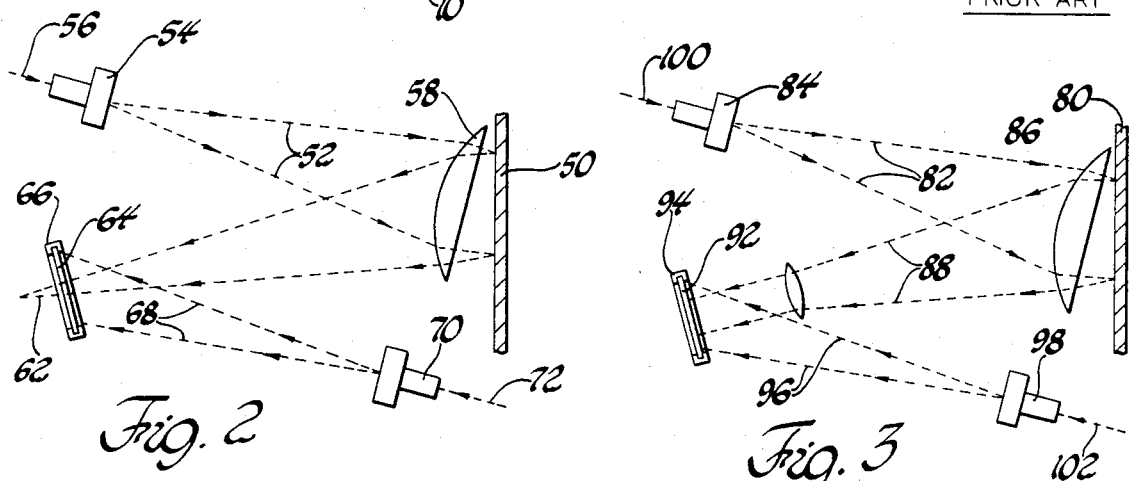
FIG. 2 is a plan view of part of the apparatus employed in the practice of holographic interferometry in accordance with the first preferred embodiment of the present invention.
FIG. 3 is a plan view of a portion of the apparatus for practicing holographic interferometry in accordance with the second preferred embodiment of the present invention.

FIG. 2 illustrates apparatus constituting a first embodiment of the present invention. The apparatus is designed to perform holographic interferometric inspection of a section of a member 50 which may be supported independently of the optical apparatus and may constitute a portion of a larger assembly such as an aircraft body panel, either supported by itself or while actually forming part of the air craft. The only limitation on the member 50 is that the section to be inspected has a surface which has a strong specular of near specular reflection component such as an aluminum sheet. The test for this specular reflecting property is the viewer's ability to see a reflected image of the illumination source, even though the image may be smeared.

The optical apparatus is not illustrated in full detail but includes means for deriving a diverging beam 52 which illuminates the section under observation from a device such as a spacial filter 54 which receives a beam 56 from conventional apparatus of the type illustrated in FIG. 1. The object beam 52 illuminates a section of the test specimen 50 through a field lens 58 which constitutes a large planoconvex lens having a size at least as large as the area being inspected. The lens 58 is disposed with its plano side adjacent to and slightly inclined with respect to the surface under observation. The lens 58 acts to culminate the object beam 52 so that its rays are parallel when they impinge on the surface being inspected. The specularly reflected illumination forms a beam 60 which passes through the field lens 58 and is directed toward an image point 62 where an image of the source 54 is focused.

Since the illuminated surface of the specimen 50 is not fully mirrorlike, the beam 60 will not be sharply defined but will constitute an area of higher power density than exists outside this area.

A photographic plate 64, supported in a plate holder 66, is positioned between the lens 58 and the image point 62 so as to intercept a substantial portion of the beam 60.

The photographic plate 64 is also illuminated by a reference beam 68 derived from a spacial filter 70 provided with an incoming beam 72. The beams 72 and 56 are derived from a single laser (not shown) in a conventional manner.

The hologram which is formed on a plate 64 by an appropriate exposure to the object beam 60 and reference beam 68 and subsequent development will, when properly illuminated, allow the reconstruction of the image of the entire section of the specimen 50 which is illuminated by the object beam. This reconstruction will appear to have an aerial image of the illumination source disposed in front of it and it will be necessary to look through the image of the source to observe the image of the specimen. While this may be distracting and somewhat tiring this technique will allow the observation of the entire illuminated section of the test specimen with a highly efficient degree of utilization of the illuminating light. This degree of utilization of light is so high that extremely short exposure times may be employed relative to those required in the prior art technique of FIG. 1. In typical configurations we have found that the beam power density gain through the use of this technique is from 3 to 4 orders of magnitude. This allows reduction of exposure times by the same factors and accordingly eliminates the need for support of the test specimen with a high degree of stability relative to the optics.

The effect of the field lens 58 in the system of FIG. 2 is simply to focus the specularly reflected light to an image point. This could also be achieved by other lens arrangements and combinations. For example, the geometry need not be such that the object beam passes through the field lens both before and after reflection from the test of the specimen surface. A suitable lens could be positioned to receive the specularly reflected light from a surface directly illuminated with an object beam and to focus that light to a point source but the geometry illustrated has been found to be preferable.

A second embodiment of the invention, illustrated in FIG. 3, obviates the viewing difficulty caused by the aerial image of the illuminating source being superimposed on the reconstructed image of the test specimen in holograms formed by the apparatus in FIG. 2. As illustrated in FIG. 3 a test specimen 80 is illuminated by an object beam 82 derived from a spacial filter 84 and passed through a field lens 86 positioned in the same manner as the field lens 58 in the embodiment of FIG. 2. The specularly reflected beam 88, after passing through the field lens 86, is directed to an object lens 90 positioned adjacent to the point in which the reflection of the source 84 is imaged. The object lens 90 is positioned so as to collect nearly all of the high intensity portion of the specularly reflected light. A photographic plate 92, supported on a holder 94, is positioned at the focal point of the object lens 90. A reference beam 96 derived from a spacial filter 98 also illuminates the photographic plate. Again, the beam 100 which enters the spacial filter 84 and the beam 102 which enters the spacial filter 98 are derived from a common coherent source in a conventional holographic manner.

The photographic plate 92 records a hologram of the light exiting the object lens 90. Upon reconstruction of the hologram an aerial image of the original object and a virtual image of the exit pupil of the object lens 90 is seen.

Figure 4:
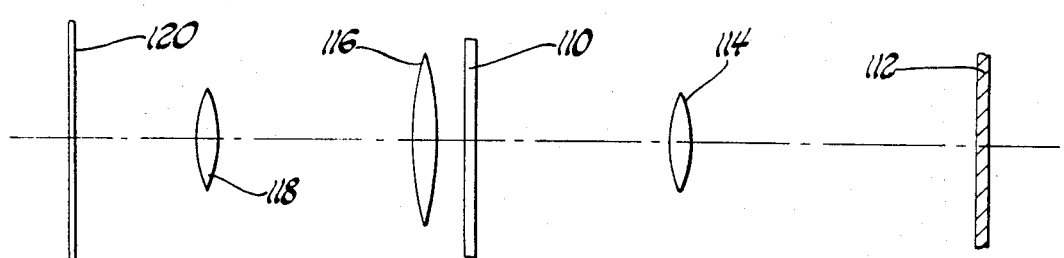
FIG. 4 is a plan view of apparatus for viewing the hologram formed by the apparatus in FIG. 3.

When the resulting hologram 110, illustrated in FIG. 4, is properly illuminated an aerial image of the illuminated surface of the object 112 and the exit pupil of object lens 114 may be seen. In order to view this image from one position field lens 116 is positioned adjacent the opposite side of the hologram so as to direct the light to the viewing lens 118 which focuses the aerial image onto a photosensitive surface 120. The surface 120 is preferably the photo cathode of a TV pickup tube allowing the remote observation of the aerial image.

The image plane technique utilized in connection with the apparatus of FIG. 3 allows the performance of double exposure holographic interferometry employing two reference beams bearing different angles with respect to the holograms. As disclosed in my United States copending patent application Ser. Nos. 12,282 and 32,941, this technique allows the later manipulation of the reference beams to adjust the position and intensity of the fringes appearing on the reconstruction of the double exposure hologram. This manipulation may be made in such a manner as to compensate for overall motion of the observed surface between the two exposures.

With the apparatus of FIG. 3 a section of an object may be studied which contains areas with substantial reflected differences. When areas of relatively poor reflectivity are to be inspected the brightly reflecting areas can be masked off on the TV pickup photo cathode 120 and the reconstruction power increased until a reasonable image is obtained of the dim areas.

The methods and apparatus described allow a high efficiency use of the illumination reflected from a specular object thereby greatly decreasing the exposure time and the power requirements and in turn easing stability requirements of the system.

Having thus described my invention, I claim:

1. Apparatus for forming a hologram of a member having a specularly reflecting surface, comprising, a photosensitive recording media; a source of coherent light; means for illuminating said recording media with a reference beam of coherent light derived from said source, the arrangement of the source, the object surface and the recording media being such that the light specularly reflected from the object is directed to the recording media; and optical means arranged so as to focus the light specularly reflected from said illuminated section of the object at a point so as to intercept said recording media with focused light.

2. The apparatus of claim 1 wherein the optical means consists of a plano-convex lens having its plano side disposed adjacent to and inclined with respect to the surface of the object to be illuminated and the object beam of light from source passes through the lens for illuminating the surface section and light specularly reflected from the surface section passes through the lens before intercepting the recording media.

3. The apparatus of claim 1 wherein the photosensitive recording media consists of an object lens and a photographic plate disposed at the focal point of the lens to record the light passing through the exit pupil of the lens.

4. The apparatus of claim 3 wherein the object lens is disposed adjacent to the point at which the illumination source is imaged by the field lens.

5. Apparatus for forming a hologram of a specularly reflective surface, comprising, a laser; a photographic plate; means for illuminating the photographic plate with a reference beam derived from said laser; an object lens disposed with respect to the photographic plate so that an image of light existing from the pupil of the object lens is imaged on the photographic plate; a field lens disposed adjacent said specular surface; and lens means for directing an object beam from said laser to said surface so that the specularly reflected portion of the beam passes through the field lens so as to focus it at a point beyond the object lens, whereby the photographic media records a hologram of illuminated surfaces viewed through the objective lens.

6. The apparatus of claim 5 wherein the object lens fully intercepts the specularly reflected light rays.

* * * * *